(12) United States Patent
Boucher et al.

(10) Patent No.: US 6,889,610 B2
(45) Date of Patent: May 10, 2005

(54) ORDNANCE FIRING SYSTEM

(75) Inventors: Craig J. Boucher, Simsbury, CT (US); Paul N. Marshall, Avon, CT (US); David B. Novotney, Agawam, MA (US)

(73) Assignee: Ensign-Bickford Aerospace and Defense Co., Simsbury, CT (US)

( * ) Notice: Subject to any disclaimer, the term of this patent is extended or adjusted under 35 U.S.C. 154(b) by 0 days.

(21) Appl. No.: 10/413,771

(22) Filed: Apr. 15, 2003

(65) Prior Publication Data
US 2004/0020394 A1 Feb. 5, 2004

Related U.S. Application Data

(62) Division of application No. 09/810,089, filed on Mar. 16, 2001, now Pat. No. 6,584,907.
(60) Provisional application No. 60/190,458, filed on Mar. 17, 2000.

(51) Int. Cl.[7] .................................................. F42B 3/10
(52) U.S. Cl. ....................... 102/217; 102/206; 244/3.22
(58) Field of Search ................................ 102/206, 215, 102/217; 244/3.22

(56) References Cited

U.S. PATENT DOCUMENTS

| | | | |
|---|---|---|---|
| 2,996,991 A | 8/1961 | Menzel | 102/70.2 |
| 3,762,331 A | 10/1973 | Vlahos | 102/70.2 R |

(Continued)

FOREIGN PATENT DOCUMENTS

| | | | | |
|---|---|---|---|---|
| GB | 2 138 576 A | 10/1984 | ............ | G01R/27/00 |
| RU | 2 041 086 C1 | 8/1995 | | |
| RU | 2 046 281 C1 | 10/1995 | | |
| WO | WO 97/21067 | 6/1997 | ............. | F42D/1/05 |
| WO | WO 01/67031 | 9/2001 | ........... | F42D/1/055 |

OTHER PUBLICATIONS

Supplementary European Search Report dated Nov. 22, 2004.
Russian Federation Office Action dated Apr. 16, 2004 with English language translation.
Supplementary Partial European Report dated Aug. 4, 2004.

*Primary Examiner*—Peter M. Poon
*Assistant Examiner*—Gabriel S. Sukman
(74) *Attorney, Agent, or Firm*—Cantor Colburn LLP

(57) ABSTRACT

An ordnance system of the present invention may include or feature any one or more of: a control unit, one or more effectors (detonators, initiators, shaped charges and the like), and a two-, three- or four-wire communication bus between the control unit and the effectors; an addressable system in which all the effectors can be connected to the same communication bus and the control unit can issue coded signals on the bus addressed to a specific effector; inductive coupling between the effectors and the communication bus; and a multi-voltage level communication system in which communication signals are carried at a first voltage and arming signals are provided at a second, higher voltage. Other features may include two-way communication between effectors and the control unit and the de-centralization of firing control so that the control unit does not have exclusive control over whether the effectors function. As a result, the individual effectors possess decision-making ability and, for purposes of this invention, may be referred to as "intelligent" effectors. To participate in the decision-making process, effectors of this invention may be equipped with sensors or other diagnostic circuitry whose condition is checked for satisfactory output before functioning is permitted to occur.

14 Claims, 6 Drawing Sheets

U.S. PATENT DOCUMENTS

| | | | |
|---|---|---|---|
| 3,788,228 A | 1/1974 | Wilson | 102/70.2 R |
| 3,851,589 A | 12/1974 | Meyer | 102/70.2 R |
| 3,888,181 A | 6/1975 | Kups | 102/70.2 |
| 4,013,012 A | 3/1977 | Giattino | |
| 4,089,268 A | 5/1978 | Jaroska et al. | |
| 4,145,970 A | 3/1979 | Hedberg et al. | 102/218 |
| 4,240,350 A | 12/1980 | Münzel et al. | 102/215 |
| 4,246,845 A | 1/1981 | Winton et al. | 102/206 |
| 4,273,051 A | 6/1981 | Stratton | 102/202.2 |
| 4,297,947 A | 11/1981 | Jones et al. | 361/248 |
| 4,445,434 A | 5/1984 | Brede et al. | 102/206 |
| 4,541,341 A * | 9/1985 | Fowler et al. | 102/215 |
| 4,644,864 A | 2/1987 | Komorowski et al. | 102/215 |
| 4,674,047 A | 6/1987 | Tyler et al. | 364/423 |
| 4,685,396 A | 8/1987 | Birse et al. | 102/206 |
| 4,708,060 A * | 11/1987 | Bickes, Jr. et al. | 102/202.7 |
| 4,729,315 A | 3/1988 | Proffit et al. | 102/202.9 |
| 4,730,558 A | 3/1988 | Florin et al. | 102/218 |
| 4,739,705 A | 4/1988 | Hudson et al. | 102/222 |
| 4,829,899 A | 5/1989 | Wiker et al. | 102/206 |
| 4,846,066 A | 7/1989 | Beattie et al. | 102/215 |
| 4,976,200 A * | 12/1990 | Benson et al. | 102/202.7 |
| 4,989,515 A | 2/1991 | Kelly et al. | 102/202.9 |
| 5,014,622 A | 5/1991 | Jullian | 102/312 |
| 5,069,129 A * | 12/1991 | Kunitomo | 102/200 |
| 5,085,146 A | 2/1992 | Baginski | 102/202.5 |
| 5,206,455 A | 4/1993 | Williams et al. | |
| 5,214,236 A | 5/1993 | Murphy et al. | 102/217 |
| 5,245,926 A | 9/1993 | Hunter | |
| 5,251,548 A | 10/1993 | Spence | |
| 5,282,421 A | 2/1994 | Marsh et al. | 102/217 |
| 5,295,438 A | 3/1994 | Hill et al. | 102/217 |
| 5,406,890 A | 4/1995 | Marsh et al. | 102/217 |
| 5,440,991 A | 8/1995 | Lewis et al. | 102/218 |
| 5,444,598 A | 8/1995 | Aresco | 361/253 |
| 5,476,044 A * | 12/1995 | Boucher | 102/218 |
| 5,520,114 A | 5/1996 | Guimard et al. | 102/215 |
| 5,520,115 A | 5/1996 | Braun | |
| 5,529,264 A | 6/1996 | Bedegrew et al. | 244/118.2 |
| 5,621,184 A | 4/1997 | Gwynn, III | 102/215 |
| 5,823,469 A | 10/1998 | Arkhangelsky et al. | 244/3.22 |
| 5,825,282 A | 10/1998 | Aronne | 340/438 |
| 5,829,784 A | 11/1998 | Brown et al. | 280/737 |
| 5,829,841 A | 11/1998 | Pywell et al. | 297/471 |
| 5,831,203 A * | 11/1998 | Ewick | 102/202.5 |
| 5,884,866 A | 3/1999 | Steinmeyer et al. | 244/137.1 |
| 5,889,228 A | 3/1999 | Ewick et al. | 102/275.5 |
| 5,894,103 A * | 4/1999 | Shann | 102/215 |
| 5,912,428 A | 6/1999 | Patti | 102/215 |
| 5,929,368 A | 7/1999 | Ewick et al. | 102/215 |
| 5,992,326 A | 11/1999 | Martinez-Tovar et al. | 102/202.4 |
| 6,010,096 A | 1/2000 | Baghdasarian | 244/173 |
| 6,016,999 A | 1/2000 | Simpson et al. | 244/158 R |
| 6,059,234 A | 5/2000 | Mueller et al. | 244/158 R |
| 6,125,762 A | 10/2000 | Fritz et al. | 102/378 |
| 6,135,391 A | 10/2000 | Van Woerkom | 244/158 R |
| 6,166,452 A | 12/2000 | Adams et al. | 307/10.1 |
| 6,367,735 B1 * | 4/2002 | Folsom et al. | 244/3.22 |
| 6,418,853 B1 * | 7/2002 | Duguet et al. | 102/206 |
| 6,565,036 B1 * | 5/2003 | Palathingal et al. | 244/3.16 |
| 6,629,668 B1 * | 10/2003 | Grau et al. | 244/3.22 |

* cited by examiner

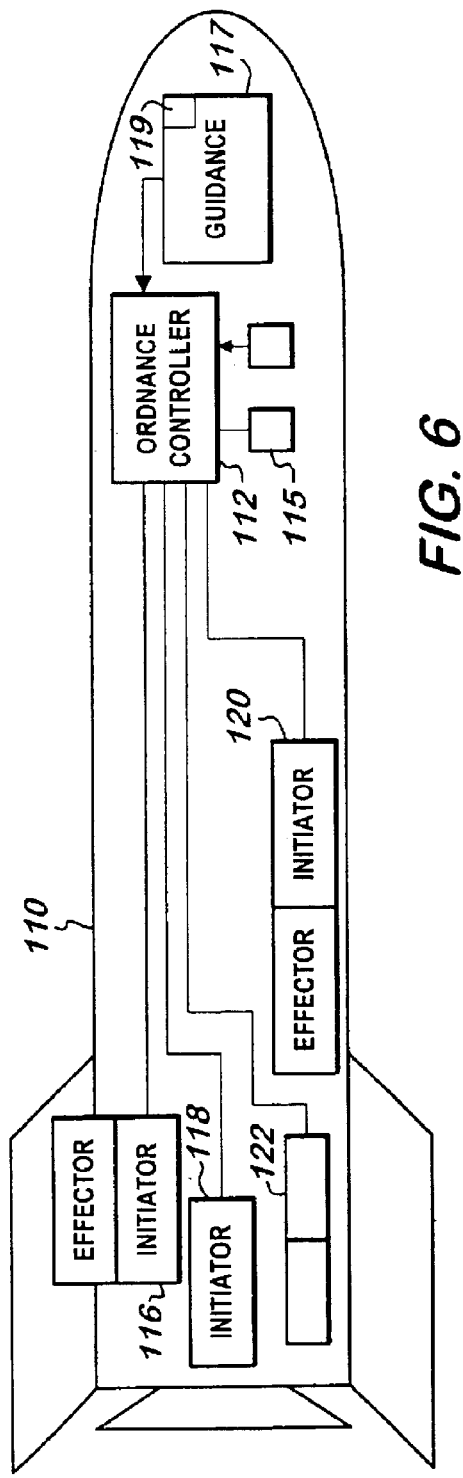
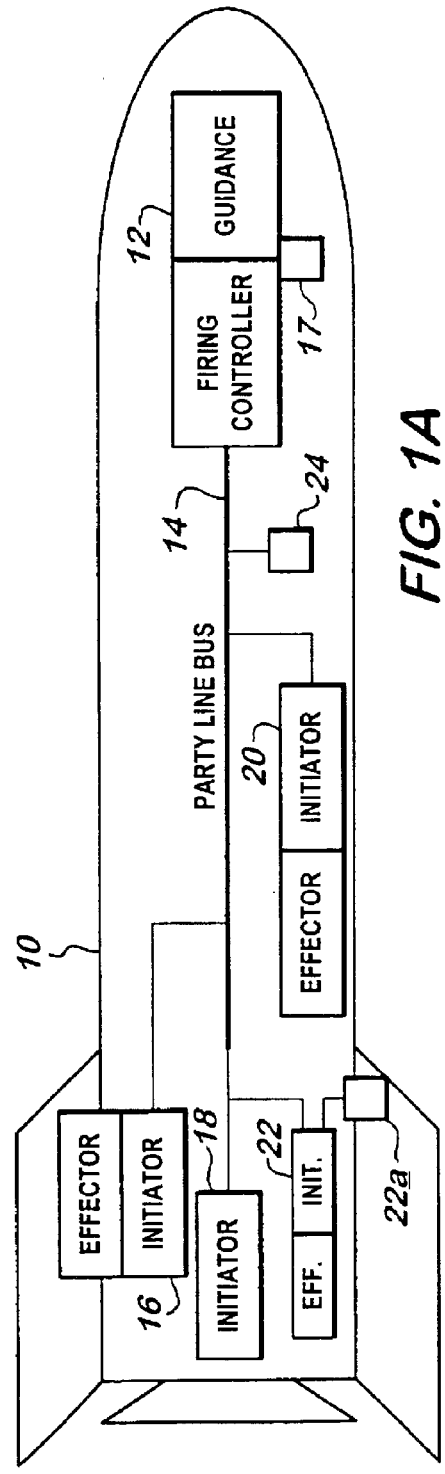
FIG. 6 (PRIOR ART)
FIG. 1A

ORDNANCE FIRING SYSTEM

CROSS-REFERENCE TO RELATED APPLICATION

This application is a division of U.S. application Ser. No. 09/810,089, filed Mar. 16, 2001 now U.S. Pat. No. 6,584,907, which claims benefit of U.S. provisional application No. 60/190,458, filed Mar. 17, 2000.

BACKGROUND OF THE INVENTION

1. Field of the Invention

This invention relates to the initiation of explosive and pyrotechnic devices in aerospace and aeronautical devices and automotive vehicles.

2. Related Art

Explosive and pyrotechnic devices such as explosive bolts, bolt cutters, separation fairings, actuators, engine igniters, etc., are used in aeronautical and aerospace applications to perform various functions such as the separation of one structure from another, the release of a structure from a stowed position to a deployed position, etc. They are also used in the safety systems of land vehicles such as automobiles, for the deployment of air bags. Such devices are typically coupled to electrically operated initiators which, in response to suitable electrical signals, initiate the devices. The initiation signals are provided by electronic control devices for controlling and coordinating the initiation of a plurality of initiators connected thereto. The combination of a control unit, a plurality of initiators and an electrical communication system through which signals are sent from the controller to the initiators is referred to herein as an "ordnance firing system".

In the prior art of aeronautical and aerospace devices such as missiles, satellites, launch vehicles, etc., and of land vehicle safety systems, the initiators in the ordnance firing systems that control the various explosive or pyrotechnic effectors (hereinafter referred to collectively as "reactive effectors") typically comprise a hot bridgewire initiating element and an initiating charge of explosive or pyrotechnic material which is sensitive to the initiating element. In order to stimulate the hot bridgewire initiating element to release sufficient energy to ignite the ignition charge, a large amount of electrical energy (relative to what is generally required for most other functions on such devices) is required. For example, the firing of a hot bridgewire initiator typically requires a draw of ten amps from a 28-volt source for a period of about 0.1 second. Since there are often numerous effectors on a given device, the total energy requirement for initiation of the effectors far exceeds the energy requirement for operation of the circuitry that controls the device. For this reason, prior art ordnance firing systems typically include a dedicated high power energy source such as a thermal or chemical battery, for the purpose of providing sufficient energy to fire the hot bridgewires. The need in aerospace and aeronautical devices to provide such batteries, which are large and heavy, has been viewed as an unavoidable but significant burden. The batteries occupy space which could go to other, more useful components of the device or to increased payload capacity and, for airborne devices, they also increase the fuel consumption of the device at all times during flight.

Another feature of prior art ordnance firing systems is that all control functions affecting whether the effectors will function reside in a control system, from which command signals are forwarded to the effectors on dedicated wires.

U.S. Pat. No. 4,708,060 to Bickes, Jr. et al, dated Nov. 24, 1987 and entitled "Semiconductor Bridge (SCB) Igniter", discloses SCB igniter elements, which are described as comprising an electrical semiconductor material disposed on a non-conductive substrate. The semiconductor material may be, e.g., a layer of n-type silicon that has been doped with phosphorus. As indicated in this Patent, other semiconductor materials and dopants can be used with similar effect. The resistivity of the doped material varies with the dopant level, as is well-understood in the art. Typically, the semiconductor material is disposed on the non-conductive substrate by a chemical vapor deposition process by which the thickness of the material can be precisely controlled. The surface of the non-conductive substrate is usually masked during the deposition process so that the layer of semiconductor material is rendered in an hourglass shape, i.e., it forms two relatively large pads joined together by a small bridge. Two pads of conductive material are then disposed upon the large pads of the semiconductor material and are separated by the bridge of semiconductor material between them. The resistivity of the semiconductor material and the dimensions of the semiconductor bridge between the conductive pads determines the effective resistance that the semiconductor bridge provides between the conductive pads. The Patent teaches a preference for SCBs of low resistance, e.g., no larger than 10 ohms, for safety reasons, i.e., in case the SCB is used with an electrostatic sensitive ignition charge (see column 7, lines 44–50) and for a reduction in resistivity with an increase in SCB size (see column 7, lines 53–55). The firing data provided pertain to high amperage (e.g., 10 amps and higher), short duration electrical initiation signals of less than 100 microseconds duration (see column 5, line 62 through column 6, line 3). The comparative data of Table 2 are difficult to interpret because SCB1 and SCB2 differ not only in resistance but also in thickness (2 micrometers vs. 4 micrometers).

U.S. Pat. No. 5,831,203 to Ewick, dated Nov. 3, 1998, discloses a high impedance semiconductor bridge detonator which illustrates, inter alia, that a SCB initiator element may be manufactured on a non-electrically conducting substrate using photolithographic masking, chemical vapor deposition, etc.

U.S. Pat. No. 4,976,200 to Benson et al, dated Dec. 11, 1990, discloses titanium bridge igniters.

U.S. Pat. No. 5,085,146 to Baginski, dated Feb. 4, 1992, discloses a planar, multi-layer low-energy initiation element.

SUMMARY OF THE INVENTION

This invention pertains to an aerospace device comprising a plurality of reactive effectors and, in particular, to the improvement comprising a plurality of initiators comprising planar, low-energy initiation elements operatively associated with the effectors for initiating the same.

According to one aspect of the invention, the device may comprise a low-energy power source connected to the initiators to provide power for arming the initiators.

According to another aspect of the invention, the device may further comprise a firing control system circuitry connected to the initiators for controlling the firing of the plurality of initiators, and a low-energy power source for arming the initiators. Optionally, there may be a common communication bus connecting the initiators to the control circuitry.

In particular embodiments, the device may comprise a missile or launch vehicle. Any such device may comprise effectors selected from the group consisting of exploding bolts, bolt cutters, motor igniters, release fairings and destruct charges.

This invention also pertains to an aerospace device comprising a plurality of reactive effectors and, in particular, to the improvement comprising a plurality of initiators associated with the effectors, a firing control system in communication with the initiators, and at least one sensor, on the device, for sensing a condition precedent to arming or firing at least one initiator, wherein at least one initiator is in communication with the sensor and that is responsive to the sensor and to the firing circuitry for initiating its associated effector upon receipt of proper signals from both the firing circuitry and the sensor.

Optionally, the device may comprise a common bus through which the initiators are linked to the firing circuitry. The sensor may be connected to the bus or to the initiator responsive to it.

At least one initiator may be programmed to self-arm or initiate based on a signal received from the sensor.

This invention also provides a method for firing an initiator for a reactive effector in an aerospace device or land vehicle comprising at least one sensor for a condition precedent to firing the initiator. The method comprises taking a time-phased reading of the sensor and comparing the reading to a predetermined temporal profile, and firing the initiator when the reading correlates to the predetermined profile.

Another aspect of this invention relates to a land vehicle comprising a plurality of reactive effectors and, in particular, to the improvement comprising initiators comprising planar, low-energy initiation elements for initiating the effectors.

According to one aspect of the invention, the vehicle may comprise a low-energy power source connected to the initiators to provide power for arming the initiators.

Optionally, the vehicle may further comprise a firing control system circuitry connected to the initiators for controlling the firing of the plurality of initiators for the effectors, and a low-energy power source for arming the initiators. There may be a common communication bus connecting the initiators to the control circuitry. Optionally, the effectors may comprise air bag inflators.

This invention also pertains to a land vehicle comprising a plurality of reactive effectors and, in particular, to the improvement comprising a plurality of initiators associated with the effectors, a firing control system in communication with the initiators, and at least one sensor, on the device, for sensing a condition precedent to arming or firing at least one initiator, wherein at least one initiator is in communication with the sensor and that is responsive to the sensor and to the firing circuitry for initiating its associated effector upon receipt of proper signals from both the firing circuitry and the sensor.

In various embodiments, there may be a common bus through which the initiators are linked to the firing circuitry; the sensor may be connected to the bus; the sensor may be connected to the initiator responsive to it; and/or at least one initiator may be programmed to self-arm or initiate based on a signal received from the sensor.

BRIEF DESCRIPTION OF THE DRAWINGS

FIG. 1A is a schematic block diagram of an integrated ordnance firing system for a missile in accordance with one embodiment of the present invention;

FIG. 6 is a schematic block diagram of a prior art ordnance firing system for a missile.

DETAILED DESCRIPTION OF THE INVENTION AND PREFERRED EMBODIMENTS THEREOF

Figure 1B:
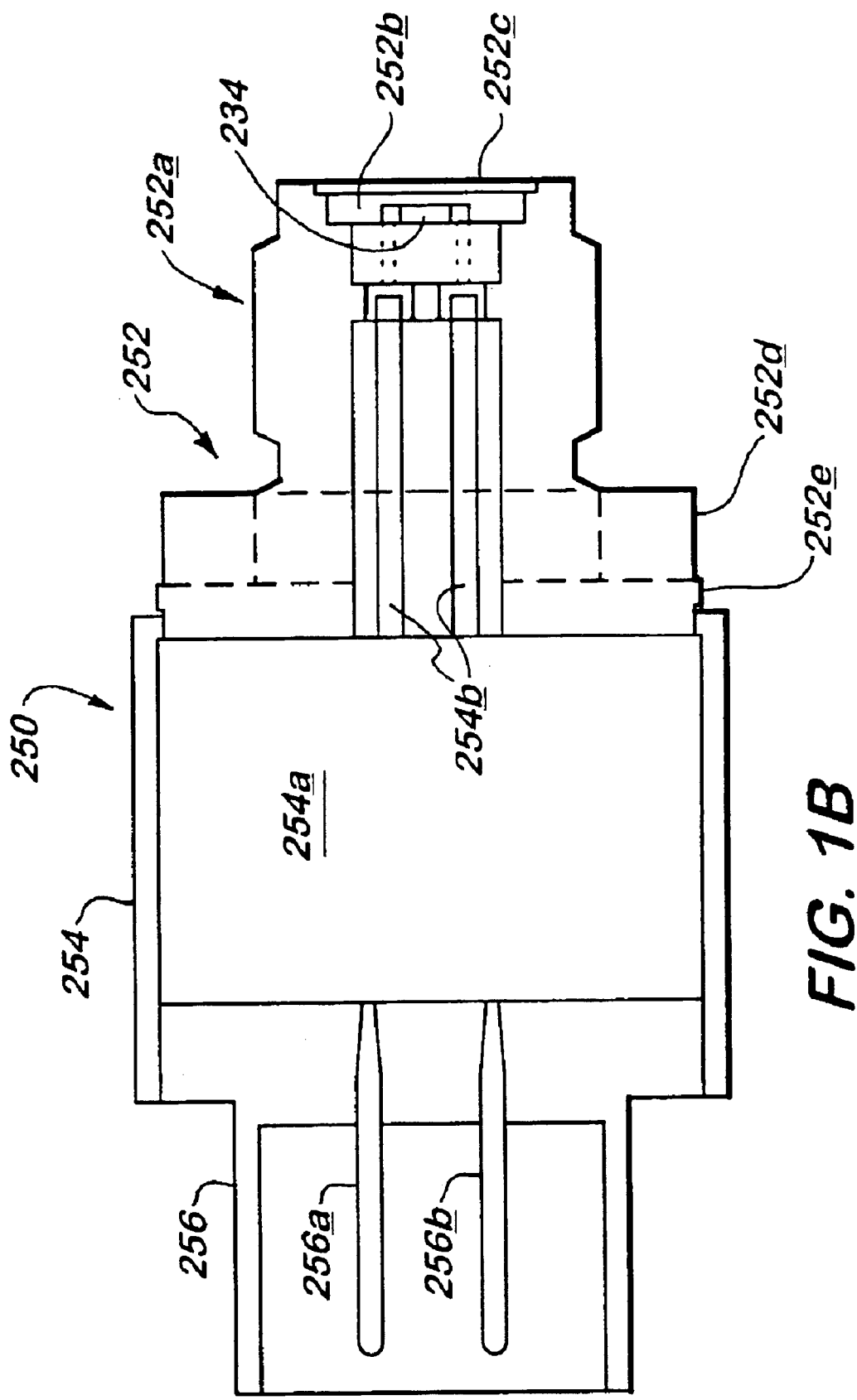
FIG. 1B is a schematic cross-sectional view of a SCB initiator for use in an aerospace ordnance firing system according to a particular embodiment of the present invention.

The present invention relates to an ordnance firing system for an aerospace device or a land vehicle comprising a plurality of reactive effectors. In one embodiment, the system comprises firing control system circuitry for controlling the firing of a plurality of initiators, a plurality of initiators comprising planar low-energy initiation elements connected to the firing control system circuitry, a low-energy power source for arming the initiators and a low-energy power source for powering the control circuitry.

In another embodiment, the invention relates to an ordnance firing system for an aerospace device or a land vehicle comprising a plurality of reactive effectors and a firing control system for controlling the firing of a plurality of initiators. In this embodiment, the firing control system comprises a low-energy power source and an input port for receiving low-energy power for arming the initiators and for powering the firing control system and for receiving firing control signals. There is also a plurality of initiators comprising planar, low-energy initiation elements connected to the firing control circuitry.

Optionally, a system according to this invention may comprise a common communication bus connecting the initiators to the control circuitry.

An ordnance firing system in accordance with the present invention may be utilized on numerous kinds of aeronautical and aerospace devices such as tactical missiles, cruise missiles, surface-to-air missiles, launch vehicles, satellites, etc. (as used herein, the term "aerospace devices" is meant to include aeronautical devices). In such devices, the ordnance system is used to initiate the function of various explosive or pyrotechnic effectors such as exploding bolts, bolt cutters, frangible joints, actuators, penetration charges, fragmentation charges, gas generators, inflators, motor igniters, through bulkhead initiators, explosive transfer lines, separation devices, destruct charges, pyrotechnically actuated valves, etc., referred to collectively herein as "reactive effectors" to include both explosive and pyrotechnic effectors. The ordnance firing system of this invention can also be used in land vehicles that utilize reactive effectors, e.g., in air bag deployment systems.

One feature of the present invention is that instead of hot bridgewire initiators, an ordnance firing system in accordance with this invention employs initiators that comprise planar, low-power initiation elements, e.g., semiconductor bridge ("SCB") initiators, tungsten bridge initiators as described, e.g., in U.S. Pat. No. 4,976,200, which is hereby incorporated herein by reference, or the type of planar, low-energy initiation element disclosed in U.S. Pat. No. 5,085,146, which is hereby incorporated herein by reference. As a result, the power requirement for arming and firing the initiators, and therefore for causing the effectors to function, is enormously reduced relative to prior art ordnance systems. This is because a planar, low-energy initiator typically requires only one-tenth the amount of energy to function than would be required by a hot bridgewire of comparable reliability and safety. Other prior art initiation elements, e.g., exploding bridgewires, exploding foil initiators, etc., require even more energy than hot bridgewires. Accordingly, where prior art ordnance firing systems require hundreds of watts of power or more, a corresponding system based on planar, low-energy initiation elements in accordance with this invention requires only tens of watts or less. This means that an integrated ordnance system according to this invention may be configured differently from prior art ordnance firing systems. One difference is that an ordnance firing system according to this invention does not require a large power source for firing the initiators. Where a dedicated power source is provided, a much smaller power source can be used or, in some embodiments, the need for a power source dedicated solely to firing the initiators may be eliminated completely. Alternatively, the initiators may optionally contain storage means, such as a firing capacitor, for storing sufficient energy to fire the initiation element. Due to the small energy requirement of the initiation element, the storage means is small enough to incorporate into the initiator. Typically, the firing capacitor need only provide about 5 millijoules to provide twice the energy requirements of the planar initiation element, which typically consumes less than 3 millijoules upon firing. In addition, it is possible to charge the firing capacitor without requiring a large amount of energy, so the initiator control circuitry can have a relatively high impedance, as discussed further below. In fact, the storage capacitor may be charged from power received from the power source provided to enable the control circuitry to function. As a result, an enormous savings is seen with respect to the cost, weight, physical volume and fuel consumption of the ordnance firing system for the aerospace device.

If a hot bridgewire or other device known in the prior art for use in aerospace or land vehicle ordnance initiation systems (exploding bridgewire, exploding foil, etc.) were designed to function at the low-energy level of the planar initiators used in accordance with this invention, it would not offer the combined safety and reliability required in the aerospace and automotive safety industries. The applicants have found, however, that initiators that meet generally accepted safety specifications and which function reliably in aerospace devices and land vehicles, and which require significantly less energy upon firing than prior art devices can be achieved by the use of planar, low-energy initiation elements as described herein. One crucial difference is that planar initiation elements are typically formed on heat-dispersing material such as a silicon or sapphire substrate which acts as a heat sink for the initiation element. The initiation element can therefore tolerate a significant degree of stray energy within the no-fire limit, whereas a bridgewire or other prior art element typically cannot dissipate heat as quickly and therefore is more vulnerable to stray currents. A planar initiation element can therefore maintain a satisfactory no-fire characteristic (e.g., 1 ampere, 1 watt) even when it is designed to fire with low energy, e.g., less than 3 millijoules.

In addition to a reduction in the power requirement and the potential elimination of the need for a dedicated power source, the present invention allows for significant reduction in size of the initiator, even though a storage means (firing capacitor) for firing the initiator is disposed within the initiator housing. Part of the reason for this size reduction is that the low-energy initiation element does not require associated circuitry with the power handling capacity of prior art initiators. Thus, circuit elements such as the firing switch and the firing control circuitry in the initiator can be assembled from circuit elements that are much smaller than those required in prior art initiators.

In addition, the present invention provides an ordnance firing system with initiators comprising initiator control circuits having numerous features described below, any one or more of which may be present alone or in combination with any other features disclosed herein.

This invention provides an ordnance firing system characterized by novel configurations of initiators, a firing control system and a communication structure. The novel configurations pertain to the structure of the initiators to which the control system is connected, the mode for connecting the initiators to the firing control system and one or more modes of operation of the ordnance firing system, i.e., modes of operation by which the firing control system and initiators cooperate to operate the effectors with which the initiators are associated. The communication structure of an ordnance firing system of the present invention may include or feature any one or more of: a two-, three- or four-wire communication bus between the control unit and the initiators; an addressable initiator system in which all the initiators can be connected to the same communication bus and the firing control system unit can issue coded signals on the bus addressed to a specific initiator; the use of inductive coupling between the initiators and the communication bus; the use of a multi-voltage level communication system in which communication signals are carried at a first voltage and arming signals are provided at a second, higher voltage. Other features may include the use of two-way communication between initiators and the firing control system unit and the de-centralization of firing control logic so that the firing control system does not have exclusive control over whether the initiators function. An initiator for use in aerospace devices or land vehicles according to this invention may therefore include initiator control circuitry of its own and as a result, the individual initiators are seen to possess decision-making ability and, for purposes of this invention, are therefore referred to as "intelligent" initiators. To participate in the decision-making process, initiators of this invention may be equipped with sensors or other diagnostic circuitry whose condition is checked for satisfactory output before functioning is permitted to occur. Other safety features, described herein, may be present as well.

A prior art missile equipped with guidance circuitry and ordnance control circuitry in accordance with the prior art is depicted in FIG. 6. Missile 110 is shown schematically as comprising guidance and control circuitry 117 which includes its own power source 119, a low-power battery of size, weight and energy sufficient only for powering circuitry 117. Typically, an aerospace control circuit for an aerospace device comprises an integrated circuit, e.g., a microcomputer or an ASIC, which requires small amounts of power and for which a low-energy power source 119 capable of providing not more than 50 watts is typically provided. In addition, missile 110 comprises ordnance controller circuitry 112 and a plurality of initiators 116, 118, 120, 122 which are associated with various reactive effectors. Circuitry 112 connects to the initiators via separate channel lines, typically with each initiator on its own line. As indicated above, the initiators are coupled to effectors which may constitute a variety of different kinds of devices, e.g., separation devices such as exploding bolts, bolt cutters, explosive nuts, inflators, actuators, and the like, for carrying out various functions of the missile in flight, e.g., the release of stages or strap-on accessories, the deployment of aerodynamic fins, the initiation of an explosive munition, cutters for the release of a panel and an inflator for dispelling a payload, e.g., bomblets, through the opening provided by the cut panel, etc. Prior art initiators 116, 118, etc., function by the use of a hot bridgewire or other prior art initiating element which consumes a large amount of electrical power. For this reason, missile 110 carries a high-power energy source 115, which may be a chemical or thermal battery or the like capable of providing the hundreds of watts needed by each of the initiators. The separate power supply is needed because the power requirements for arming and firing the prior art initiators exceeds what can be provided by a power supply normally sufficient for powering guidance and control circuitry 117. It will be appreciated that missile 110 of FIG. 6 is representative of various other kinds of aerospace or aeronautical devices which may employ an integrated ordnance system in accordance with this invention.

FIG. 1A provides a schematic illustration of a missile 10 equipped with an ordnance firing system in accordance with the present invention. The ordnance firing system comprises a firing control system 12, a communication bus 14, and a plurality of initiators 16, 18, 20, 22 for reactive effectors on the device. The initiators are connected to the bus 14 and a remote sensor 24 is also connected to bus 14.

By virtue of the present invention, missile 10 exhibits several significant advantages over prior art missile 110 (FIG. 6). First, initiators 16, 18, 20 and 22 comprise planar, low-energy initiators as disclosed herein, e.g., SCB initiators, tungsten bridge initiators, etc. These initiators are designed to function reliably and safely and with much less power than prior art initiators. As a result, the ordnance firing system does not need a high-energy power source of the power, size or weight scale of high-energy power source 115 (FIG. 6). Instead, the circuitry which controls the functioning of the initiators is powered by a low-energy power source 17 (FIG. 1A) which is sufficient for the arming and firing of the initiators. Low-energy power source 17 is the kind of power source normally associated with integrated control circuitry and, optionally, the same power source may be used to provide power for the guidance circuitry as well as for the ordnance firing circuitry. For this reason, in one embodiment of this invention, the ordnance firing system need not have its own power supply. Instead, it may be configured to include a power input junction (e.g., a pin-type junction) for connection to the power source for the other circuitry with which it will be used. Such an embodiment of this invention therefore simply comprises initiators comprising planar, low-energy initiator elements, the firing control system circuitry, the communication link between the initiators and the firing control system circuitry, and an input port for receiving power from the low-energy power source associated with the remainder of the circuitry on the aerospace device. The small energy requirements for a planar, low-energy initiation element make possible the use of an energy storage device, i.e., firing capacitor, that may be connected to or formed as part of the integrated circuit comprising the firing circuitry of the initiator. Due to the low energy consumption of a planar, low-energy initiation element, upon firing, the firing capacitor may be charged to its ready ("armed") state by power provided by the low-energy power source.

Reduction in power consumption may also be realized by using high impedance initiator firing circuitry. Therefore, in accordance with the present invention, the circuitry within initiators 16, 18, etc., may provide an input impedance of 1,000 ohms or more, e.g., 1,000 to 10,000 ohms. Providing such an unusually high input impedance also provides protection against accidental initiation resulting from stray signals on bus 14. Optionally, the high input impedance can be attained by isolating the initiator circuitry from the communication bus by the use of resistors.

As indicated above, missile 10 is merely representative of one type of aerospace device on which an ordnance firing system in accordance with the present invention may be employed. Other such devices include launch vehicles, which require many of the functions required in missiles. In addition, launch vehicles often require additional functions for which the ordnance firing system of this invention may be employed. For example, a launch rocket may have a requirement pertaining to stage separation, for which it may be necessary to initiate a plurality of exploding cutters or fasteners such as exploding bolts, or to initiate one or more frangible joints of the kind described in U.S. Pat. No. 6,125,762 to Fritz et al, dated Oct. 3, 2000, the disclosure of which is hereby incorporated herein by reference as background material. Other functions may pertain to the release of structural elements such as covers, the deployment of sub-munitions from a missile and to igniting rocket motors. An ordnance firing system of this invention may also be used on satellites, which employ ordnance systems to control reactive effectors for the deployment of structures such as antennae and solar panels. The advantage provided by this invention, i.e., use of a low-energy power source, is especially important in a satellite prior to the deployment of the solar panels. To that point, the satellite must function solely on energy provided from batteries stored thereon. The reduction of weight resulting from the use of the SCB initiators in accordance with the present invention and the use of a low-energy power source which is significantly smaller and lighter than those which have been used in the prior art reduces the weight of the satellite and therefore the fuel requirements of all stages of the rocket used to place the satellite in orbit. Conversely, for a given rocket configuration, the use of the present invention permits, without added cost, the deployment of a satellite with more hardware than was previously possible using prior art ordnance firing systems.

Another example of an aerospace device comprising reactive effectors for which the ordnance firing system of the present invention may be employed is shown in U.S. Pat. No. 5,884,866 to Steinmeyer et al, dated Mar. 23, 1999, which discloses a satellite dispenser for releasing a plurality of satellites into orbit from a launch vehicle. Similarly, the ordnance firing system of this invention may be employed to initiate the effectors shown in the following patents: U.S. Pat. No. 6,135,391 to Van Woerkom, dated Oct. 24, 2000, which discloses explosively actuated pin assembly effectors for a retention system for a detachable spacecraft capsule; U.S. Pat. No. 6,016,999 to Simpson et al, dated Jan. 25, 2000, which discloses explosive bolt effectors for spacecraft platforms which are released from a pre-deployment position; U.S. Pat. No. 5,823,469 to Arkhangelsky et al, dated Oct. 20, 1998, which discloses explosive bolt and pyro-push rod effectors for a missile launching and orientation system in which the missile comprises an annular body that can be ejected during flight; and U.S. Pat. No. 5,529,264 to Bedegrew et al, dated Jun. 25, 1996, which discloses explosive bolt effectors for a launch missile system. All of the foregoing patents are incorporated herein by reference as background information.

The assembly of an initiator comprising a planar, low-energy initiation element for use with effectors on an aerospace device or land vehicle will now be described. A SCB is formed as is known in the prior art, to provide a SCB initiation element on a non-conductive substrate for use in initiator 250 (FIG. 1B). Initiator 250 comprises an output housing 252, a body portion comprising sleeve 254 and an input portion comprising input connector 256. As indicated above, output housing 252 is configured to conform to a standard interface commonly used for effectors in aerospace devices, e.g., it may comprise a fitting in accordance with a specification known in the aerospace industry as AS4395 (0.375-24 UNJF). As shown in FIG. 1B, such a housing comprises a hex nut portion 252d and a threaded head portion 252a for coupling to a threaded effector. Head portion 252a contains a glass or ceramic insulator on which a SCB 234 is mounted. The SCB 234 is disposed in a recess in which a reactive output charge 252b is disposed. The output charge is maintained in the recess by a cushion material and a rupturable disc 252c which is welded to housing 252.

The output charge 252b may comprise any suitable reactive material which, upon functioning of the SCB initiation element, will react, displace or burst rupture disc 252c and provide the output necessary to initiate the associated effector. In one particular embodiment for producing a pyrotechnic output, output charge 252b may comprise a zirconium/potassium perchlorate (ZPP) pyrotechnic mixture. It will be understood that other pyrotechnic materials could be used with, or instead of, ZPP, and that an explosive material could be used if an explosive output is desired. The term "reactive material" as used herein encompasses both pyrotechnic and explosive materials. Output housing 252 also includes a base portion 252e which is welded to sleeve 254.

Within sleeve 254 is disposed initiator firing circuitry 254a, which preferably comprises integrated circuitry. Initiator firing circuitry 254a may include communication circuitry and, optionally, a storage capacitor for obtaining and storing energy for firing the SCB. Initiator firing circuitry 254a communicates with the SCB initiation element via output lines 254b, and with the ordnance system firing control circuitry (not shown) by means of four wires connected to four pins, only two of which are shown, pins 256a and 256b, which are secured to initiator 250 via input connector 256. Pins 256a and 256b and the other electrical conductor pins may be mounted in a glass plug in input connector 256. Input connector 256 is welded to sleeve 254 at the end opposite from output housing 252. Input connector 256 is preferably configured as a standard connector, e.g., it may comprise a connector in accordance with a specification known in the aerospace industry by the designation MIL-C-26482. Typically, output housing 252, sleeve 254 and input connector 256 will all be formed from 304L stainless steel and the resulting initiator will be hermetically sealed to protect the components therein.

In various embodiments, input connector 256 may be adapted to include as many input pins (2, 3, 4, etc.) as is required by initiator firing circuitry 254a and the ordnance system firing control system (not shown). Likewise, it will be recognized by one of ordinary skill in the art that initiator 250 may comprise any other suitable coupling means in place of, or in addition to, hex nut portion 252d of the AS4395 fitting in order to secure initiator 250 to its associated effector. Such coupling means may include, for example, the features of a bayonet-style mount, a latch-style mount, etc.

Referring again to FIG. 1A, another feature of the ordnance firing system of this invention is the use of a multi-line party bus for establishing communication between the firing control system circuitry and the various initiators. This feature provides advantages irrespective of whether an initiation system employs planar, low-energy initiators and a low-energy power source. According to this feature, initiators 16, 18, 20 and 22 each contain communication circuitry for receiving and evaluating signals received via communication bus 14 from firing control system 12 or, optionally, at least one remote sensor 24. Since all of the initiators are connected to the same communication bus 14, they all receive each of the signals issued by firing control system 12. However, in accordance with the present invention, initiators 16, 18, etc., contain initiator firing circuits that are programmed to recognize an address portion of signals received on communication bus 14. The initiator firing circuit is programmed only to respond to those signals that contain an address code identified with that initiator. The address code may constitute a specific address unique in the system to that initiator; it may be a "shared" address also recognized by some other initiators in the system but not all of them, or it may be a "universal" address which all initiators connected to bus 14 recognize. Firing control system 12 and remote sensor 24 are configured to emit signals that contain the appropriate address codes so that the signals will be recognized and acted upon by the appropriate initiators.

As a result of the use of coded signals, initiators 16, 18, etc., may be connected to shared wires in communication bus 14 and bus 14 may therefore comprise merely two or three communication wires. A four-wire bus might be used as well, to provide separate wires for arming power, operation power, communication and ground. Similarly, initiators 16, 18, etc., may optionally be configured to generate and emit initiator signals onto communication bus 14. Firing control system 12 may be-designed to receive and interpret initiator signals received via bus 14. The signal emitted by an initiator may contain an identifier code that is unique to the issuing initiator so that the firing control system can distinguish among signals from the various initiators. Accordingly, one feature of the present invention is that firing control system 12 and initiators 16, 18, etc., are configured for two-way communication along bus 14. This feature of the invention allows for an ordnance firing system in which initiators can provide feedback to the control unit along the bus. The ordnance firing system can be configured so that, prior to a firing sequence, the firing control system unit issues a query signal to one or more initiators and the initiators respond to indicate their readiness to function.

One feature of an ordnance firing system according to this invention is that the initiators may communicate with the firing control system to indicate their readiness to function before actually being armed. This greatly enhances the safety with which such a query can be carried out.

Optionally, sensors connected to the bus may respond to query signals on bus 14 with sensor feedback signals. The sensor feedback signals may optionally report the result of a self-test in which the initiator and/or sensor indicates the condition of its internal circuitry and/or its readiness to function. Likewise, remote sensor 24 may be equipped to issue a signal addressed to firing control system 12 that reflects a condition that bears on whether one or more of the initiators in the system should function. The content of the sensor signal from remote sensor 24 may be used to determine what other signals should be emitted by firing control system 12. Internal or external sensors for use in or with any one of initiators 16, 18, etc., to measure any of a variety of parameters may include an acceleration sensor, to sense up to 20 g acceleration or greater, and/or an atmospheric pressure sensor to indicate changes in atmospheric pressure or a rate of atmospheric pressure change. Other factors that might be reported by sensors could include humidity or moisture and electromagnetic radiation.

Another advantage associated with the use of a communication bus as shown in FIG. 1A and the use of addressable initiators is that such a system can easily be modified to accommodate any desired number of initiators. Prior art ordnance firing systems as represented in FIG. 6 require individual wires for each initiator and their firing control systems have limited capacity with regard to the number of initiators they can service. To utilize such a system in an aerospace device requiring more than the fixed maximum number of initiators, it is necessary to install a second firing control unit for the additional initiators. In contrast, by employing a bus architecture, as many initiators as may be desired can be spliced into the bus. The associated firing control system is programmable and is easily adapted by one of ordinary skill in the art to control as many initiators as may be desired to include on the bus.

Another feature of the present invention is that firing control system 12 and initiators 16, 18, etc., may be configured so that different types of signals are conveyed at different power levels, e.g., different voltage levels along bus 14. For example, communication signals, e.g., signals from firing control system 12 intended only as a query to the initiators for readiness, response signals from the initiators to firing control system 12 indicating their readiness to be armed, and fire initiation signals from firing control system 12 to the initiators may occur at a low power level, preferably lower than the no-fire threshold of the initiators. In this way, test and programming signals that are not intended themselves to arm and/or initiate the initiators are carried out at a level that is insufficient to arm and/or initiate the initiators even if the communication signals are somehow misinterpreted. Such communication signals may be carried on bus 14 at, e.g., about 7 volts. When the system is ready for arming, the energy for arming the initiators may be provided at a higher level than the communication signal level, e.g., at 28 volts. Optionally, the arm signal and communication signal can travel on separate communication wires in bus 14. Bus 14 may comprise three wires, a power or arming wire, a communication wire and a ground wire, or four wires to permit separation of the firing system power supply from the arming power wire. The use of bus 14 obviates the need for direct, exclusive point-to-point hard-wire connections between the firing control system and each initiator.

Another feature of the present invention provides that initiators 16, 18, etc., need not be hard-wired to bus 14. Instead, they may be connected to bus 14 via magnetic or inductive couplings. Such couplings provide an advantage over hard-wire connections in that the magnetic or inductive coupling inherently acts as a buffer to prevent certain kinds of unwanted signals from flowing between the initiators and the bus. In addition, inductive coupling will permit reliable signal transfer in a variety of adverse conditions, e.g., in environments that may be dry, humid, wet, dirty, etc., and through a variety of media: vacuum, gas, liquids, solids, etc. Initiators designed for inductive coupling to bus 14 can be designed to be especially resistant to malfunctions induced by electrostatic discharge and ambient radio frequency signals when they are not connected to the bus. An inductive coupling will also allow both communication signals and power signals to be multiplexed on the same signal medium. Optionally, the inductive coupling may be integrated into the initiator housing.

As indicated above, one novel feature of the present invention is that the control over the firing event may reside more in initiators 16, 18, etc., than in the prior art. In a system according to the prior art, a firing control system 112 (FIG. 6) issues signals, e.g., a high-power pulse, forcing the initiators to initiate the effectors, and the initiators were not equipped to override the firing signal received from the control unit. Stated differently, with prior art initiators, a signal from the firing control system unit was sufficient to initiate firing. In contrast, one aspect of the present invention provides "intelligent" initiators. Intelligent initiators possess initiator control circuitry having some ability to override a signal from the firing control system indicating readiness to fire, thus de-centralizing the firing decision from the firing control system. The firing signal from the firing control system then becomes one input or factor taken into account by the initiator in deciding whether to fire. Other signals bearing on the decision to fire may be derived from sensors to which the initiator is responsive.

Where the ordnance firing system comprises one or more sensors, each sensor may measure a condition which is a condition precedent to firing, i.e., some or all of the initiators in the ordnance firing system may be required to delay firing until the sensor indicates that the condition is obtained. For example, in the case of a missile, the sensor may indicate distance from the plane from which the missile is fired and the condition precedent may be a minimum required distance from the plane. Optionally, the initiator control circuitry and one or more initiators may be programmed to postpone function until such a signal is received from the sensor. Therefore, the firing control circuitry of the integrated ordnance system may provide only part of the instructions and impetus required by the initiator to fire. For example, the firing control circuitry may provide a signal indicating readiness to arm the initiator and may provide a low-energy source for arming the initiator, but the initiator may then wait for input from the sensor before functioning. This allows the system to respond to environmental conditions that may vary after the firing control system has determined that conditions for firing are imminent. Such sensors may include the remote sensor 24 connected to bus 14. In other embodiments of the invention, however, the sensor may be associated exclusively with the initiator making the firing "decision". For example, there is an external sensor 18a associated with and directly connected to initiator 18. Either or both of sensor 18a and sensor 24 may sense, for example, any one or more environmental variables pertinent to the function of the initiator or the ordnance system as a whole.

In various applications, external factors describing the motion of the initiator or a device on which the initiator is mounted (e.g., a mortar shell) may be required to determine the proper conditions for firing. Sensors that indicate acceleration, roll rate, pitch, yaw, velocity, distance, altitude, attitude, temperature, hydraulic or atmospheric pressure, etc., may provide information that is significant to the proper functioning of the initiator 18. Initiator 18 may then comprise initiator control circuitry that will, upon receipt of a firing signal from firing control system 12, receive and evaluate the output of sensor 18a and may then function only if it determines that sensor 18a indicates favorable conditions. Similarly, initiator 22 is responsive not only to signals from firing control system 12 but also to an internal sensor 22a which may sense conditions inside the initiator shell.

Such internal conditions may include the condition of the firing circuitry of initiator 22, the condition of the output charge of initiator 22, etc. Other relevant internal conditions that might be reported by sensor 22a include temperature, voltages, frequencies, current draw, initiation element continuity, etc. If a firing signal is received from firing control system 12 but the requisite signal is not received from the sensor 22a, initiator 22 may optionally be programmed to postpone firing despite the firing signal from firing control system 12. Sensor 22a may thus provide a built-in test function for manufacturing quality as well as field reliability.

According to another aspect of the present invention, the decision to arm and/or initiate one or more initiators may be based on a time-phased sequence of one or more sensor signals. In other words, the ordnance firing system (i.e., the firing control system and/or one or more intelligent initiators) may respond to a temporal characteristic or profile of a sensor signal and thus to a temporal characteristic of the internal or external condition associated with that sensor, rather than to a single, instantaneous and possibly artificial or accidental value of the signal or of the condition. For example, rather than making initiation dependent upon the receipt of a sensor signal that indicates attainment of acceleration of 30 g or more (either as the sole condition of initiation or as one of a combination of conditions), the system may be programmed to respond to a signal having a predetermined temporal profile which indicates that acceleration of 30 g or more is attained and is followed by at least 3 seconds of acceleration of at least 3 g. As another example, initiation may depend upon receiving signals that indicate that a pressure altitude of less than 500 feet is attained after a pressure altitude of at least 3000 feet is registered for at least 10 minutes. Such temporal analyses of sensor signals permit greater specificity in defining the conditions under which initiation is desired than decision processes that respond merely to the instantaneous magnitude of a sensor signal without regard to its temporal profile. For example, the temporal acceleration analysis described above permits the system to distinguish between the air-borne deployment of a munition and the inadvertent dropping of the munition from a loading fixture onto a work site floor. Optionally, initiation may be associated with a combination of temporal characteristics of two or more sensor signals, or a combination of one or more temporal sensor signal profiles with one or more instantaneous sensor signal values.

Optionally, the output signal from sensor 18a or sensor 22a may be delivered to bus 14 as data for use by other initiators or by the firing control system 12. The two-way communication between the firing control system 12 and a specific initiator along bus 14 as described above may include signals from a sensor specifically associated with a particular initiator as sensor 22a is specifically associated with initiator 22. The sensor signal, having been conveyed via bus 14, may optionally be read as input data by other initiators as well as by the firing control system 12. The use of a sensor closely associated with an initiator as described above results in improved reaction time for the initiator and the system as a whole because the data required to determine whether the initiator is ready to function is derived from a nearby source. Also, the size and weight of such sensors are smaller than that of sensors in prior art systems.

In one optional embodiment of the invention, any one or more of initiators 16, 18, etc., may be "self-arming". Rather than depending upon the receipt of an arming signal from firing control system 12, a self-arming initiator in accordance with the present invention may respond to signals received from internal or external sensors associated therewith, and/or signals received via bus 14 from firing control system 12, one or more of sensor 18a, sensor 22a and sensor 24, etc., and determine whether such signals indicate a predetermined condition at which the initiator should arm itself. (Arming generally refers to the charging of a firing capacitor whose subsequent discharge through the semiconductor bridge will initiate the device). The energy for arming the initiator may be supplied from a battery that serves only to arm the initiators, or it may be drawn from firing control system 12, based on power drawn from the power source for firing control system 12. Alternatively, the initiator control circuitry may arm the initiator solely in response to an arm command issued by the firing control system. In another embodiment, the firing control system may be able to provide power for arming the initiator directly, without having to control the operation of an arming switch in the initiator.

It will be evident in view of the discussion above that an ordnance firing system in accordance with the present invention that comprises intelligent initiators differs from blasting-type initiation systems because in a typical mining blast, the number and sequence of initiations is predetermined. The use of "intelligent initiators" that rely on sensors as described herein to determine whether or not it is appropriate to arm and/or to fire the associated effector provides a system in which an on-going assessment of the environment can determine which initiators function, even after the initial firing of the first reactive effectors. In blasting operations, the arming decision is made at a central control unit and once the blast has started, the system generally does not provide any way for it to vary or alter in a controlled, calculated manner the order or sequence in which detonators are fired.

Figure 1C:
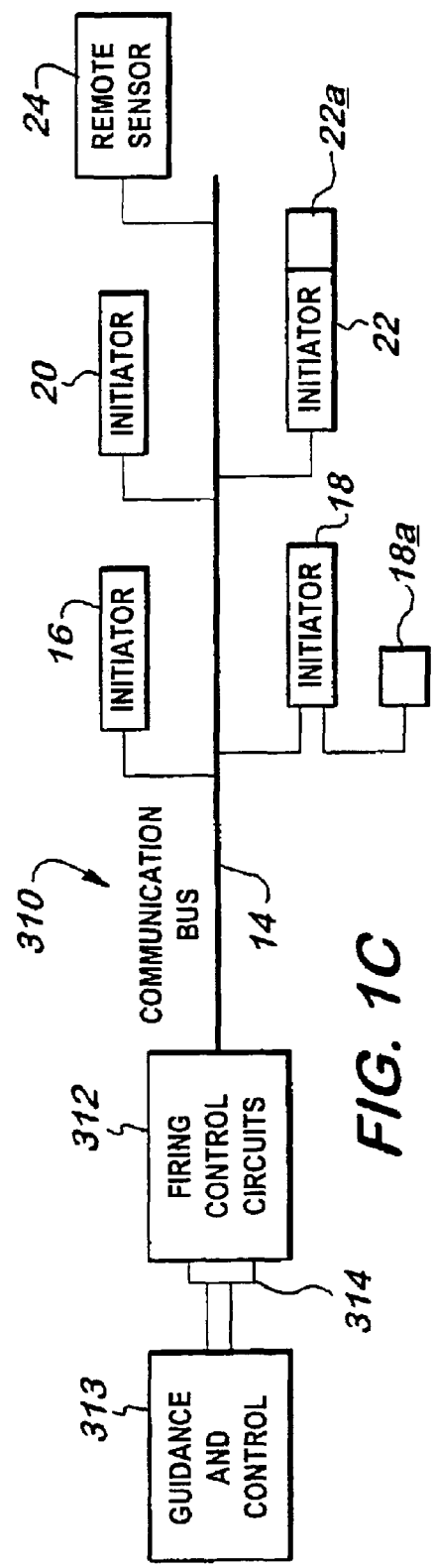
FIG. 1C is a block diagram of an embodiment of an ordnance firing control system according to this invention, which draws power from other circuitry.

In FIG. 1C, an ordnance firing system 310 in accordance with another embodiment of the invention is shown. System 310 comprises a firing control circuit 312 which communicates with initiators 16, 18, 20 and 22 via communication bus 14 in the same way that the firing and guidance circuitry 12 (FIG. 1A) of rocket 10 communicates with corresponding structures shown therein. In the embodiment of FIG. 1C, however, firing control circuit 312 contains no power source of its own. Instead, it both communicates and draws power from the guidance and control circuitry 313, which shares power from the low-energy power source therein. Firing control circuit 312 is equipped with an input port 314 for receiving communication signals and power from guidance and control circuit 313.

Figure 2:
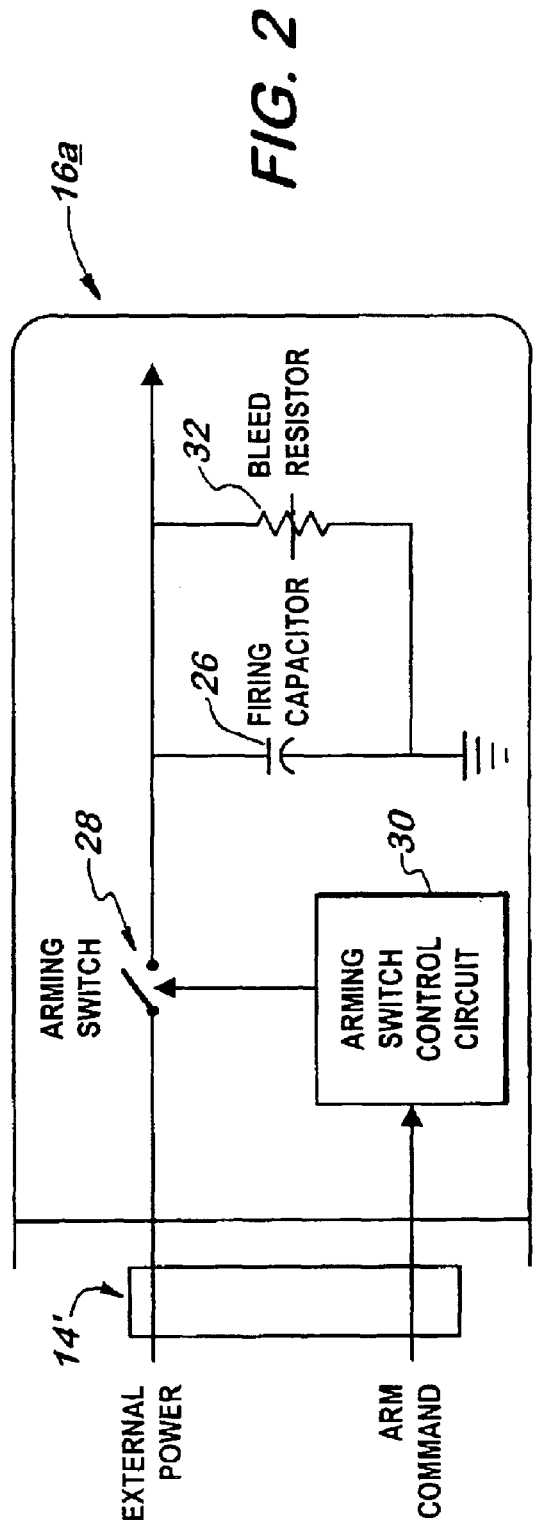
FIG. 2 is a partial schematic block diagram of an initiator in connection with a particular embodiment of the invention.
Figure 3:
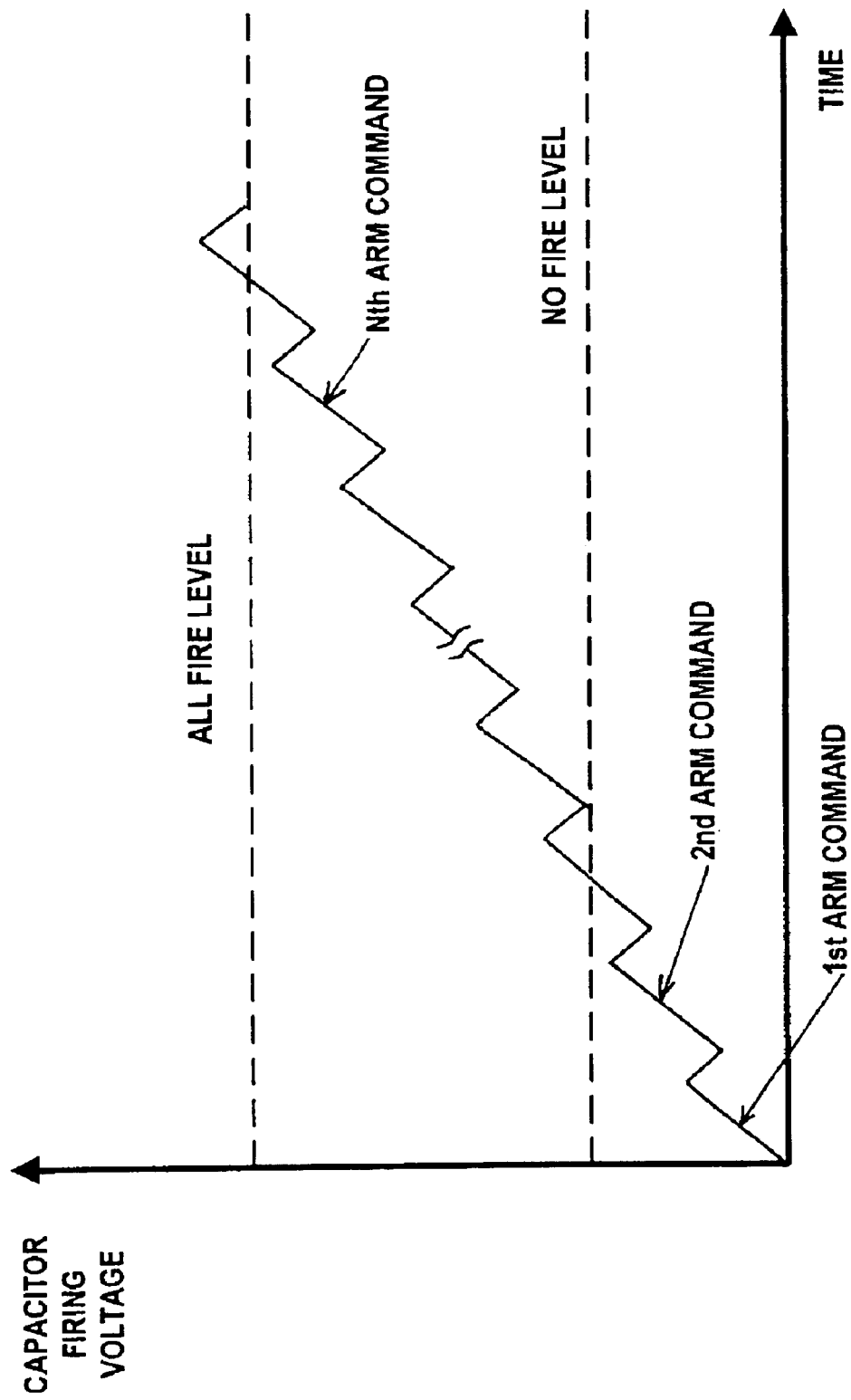
FIG. 3 is a graph illustrating the time-phased arming of an initiator in accordance with another embodiment of the invention.

In an optional embodiment of an integrated ordnance system in accordance with the present invention, the firing control system and at least one initiator are configured to provide a time-phased arming. In accordance with this feature of the system, which will be described herein with reference to FIG. 2, a communication bus 14' and firing control system (not shown) are configured to provide external arming power on one line and an arm command communication signal on another line. The external arming power is provided in order to arm initiator 16a by charging firing capacitor 26 with energy sufficient to initiate the semiconductor bridge (not shown) in initiator 16a. The external power must pass through arming switch 28 to charge firing capacitor 26. Arming switch 28 is designed to close only for a fraction of the time required to charge capacitor 26 from bus 14'. Arming switch 28 is therefore referred to as a "momentary switch". Arming switch 28 is under the control of arming switch control circuit 30 which is part of the initiator control circuitry disposed within initiator 16a. The arm command received via communication bus 14' is conveyed to arming switch control circuit 30. In accordance with this aspect of the invention, arming switch control 30 will only close arming switch 28 once for each arm command received so that firing capacitor 26 cannot progress from a fully discharged condition to a charge sufficient to initiate the semiconductor bridge during a single arming interval. Rather, each arming interval provides only a partial charge for firing capacitor 26. Accordingly, a series of arming signals is required, and a full charge can only be attained in a stepwise fashion, as depicted in FIG. 3. Referring again to FIG. 2, firing capacitor 26 is connected in parallel with a bleed resistor 32 which tends to bleed off the partial charges imposed on firing capacitor 26. Accordingly, in order to fully charge firing capacitor 26, a series of arming intervals during which arming switch 28 is closed must occur with sufficient duration and frequency to overcome the dissipative function of bleed resistor 32. The arming switch control circuit 30 closes and opens arming switch 28 once and only once for each arm command. Once armed, i.e., once firing capacitor 26 is charged sufficiently to initiate the initiation element in the initiator, the periodic arm commands must continue in order to maintain the sufficient charge in capacitor 26. In effect, the configuration of circuit elements shown in FIG. 2 provides a safety feature in which initiator 16a can only be armed for firing if arm commands are generated from the control unit (not shown in FIG. 2) at a frequency determined by the requirements of the circuitry in initiator 16a. The specific requirements for arming initiator 16a make unintended arming and firing by virtue of stray electromagnetic signals or as the result of malfunction of the control unit highly unlikely.

Figure 4:
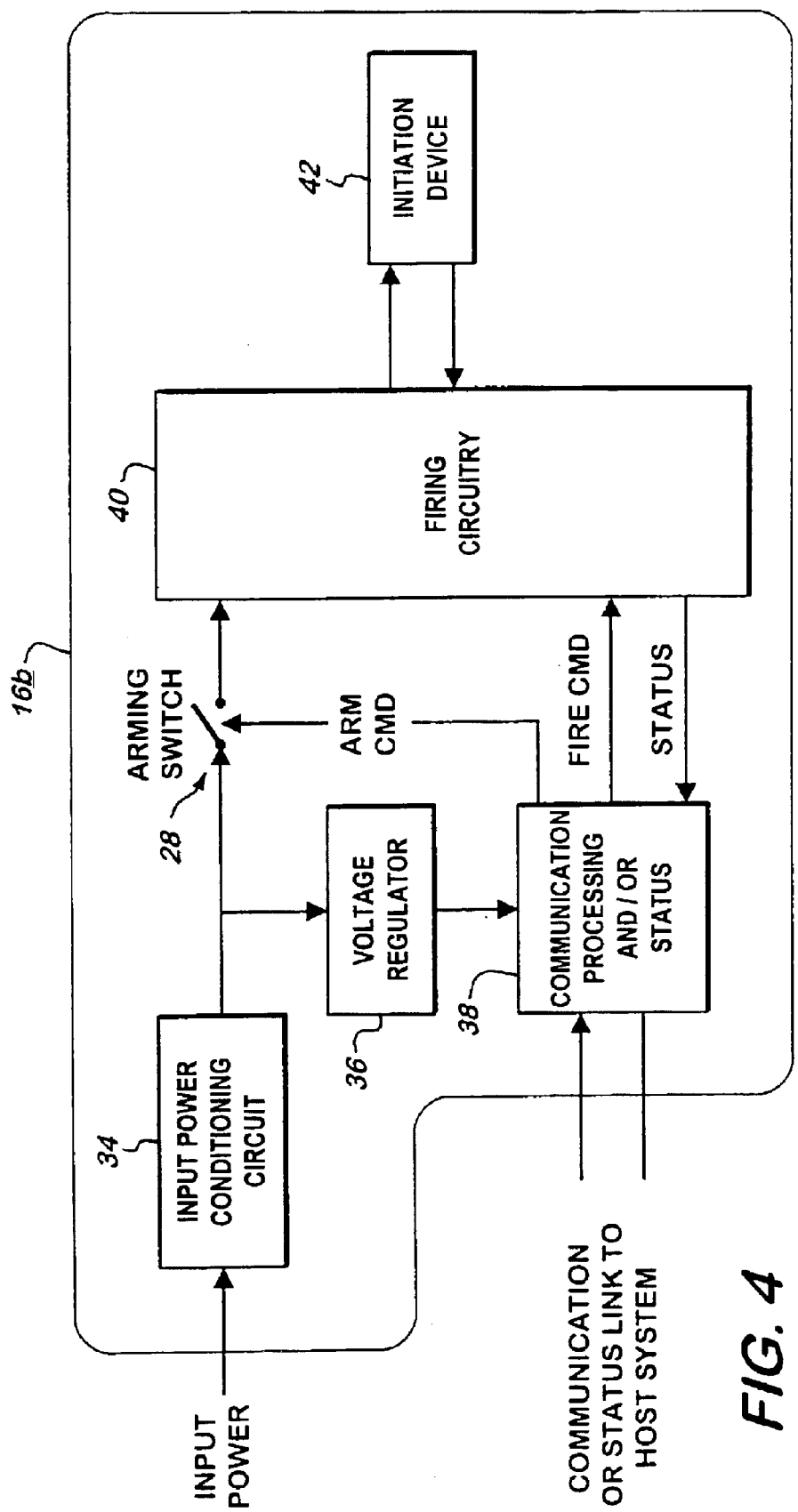
FIG. 4 is a schematic block diagram of an initiator in accordance with yet another embodiment of the invention.

FIG. 4 provides a schematic diagram of an initiator control circuit with separate connection leads for input power and communication signals from the communication bus according to a particular embodiment of this invention. The conditioning circuit 34 of initiator 16b converts the input power to a direct current voltage that is suited for use by the remainder of the initiator circuitry. Optionally, conditioning circuit 34 could have a high impedance to external potentials as an added safety feature against inadvertent initiation caused by stray signals or noise as may be induced by ambient radio frequency signals. The input power received by conditioning circuit 34 may be at various levels which may be used as follows: at 0 to 5 volts, no significant reaction or response is generated in initiator 16b. A signal between 5 and 20 volts may be used for communication, to close switches for arming and firing, to obtain information in response to self-diagnostic sensors (not shown) in initiator 16b, etc., but signals at this voltage level are lower than the no-fire level of the initiator. This allows for communication with the added safety feature of using signals which, even if misinterpreted as a firing signal, have insufficient magnitude to arm and fire the device. Signals at greater than 20 volts DC can be used for communication, to operate arming and firing switches, to obtain status information and to fire the initiator. Voltage regulator 36 takes the conditioned input power and regulates it to a nominal voltage, typically 3.3 or 5 volts DC for use by the processing/status circuit 38.

In the embodiment of FIG. 4, initiator 16b preferably communicates with a firing control system (not shown) through a communication bus, through a hardwire link, inductive coupled link, a wireless link, an optical link, etc. Alternatively, communication and power signals may be delivered via a direct wire connection rather than over a bus.

The processing/status circuit 38 interprets commands sent from the firing control system unit and performs the arming, firing, self-test, etc., functions and, when appropriate, issues a response signal to the firing control system or, along a bus, to other initiators. Arming switch 28 applies firing voltage to the firing circuitry 40. Initiator firing circuitry 40 will contain the necessary electronic, mechanical, optical, etc., components to force the initiator to function and will include, for example, a source of initiation energy such as a firing capacitor (not shown), a firing switch (not shown), etc. The initiation element 42 may be a semiconductor bridge or other low-energy, e.g., planar, initiation element, or a prior art element such as a hot bridgewire, exploding bridgewire, etc.

Figure 5:
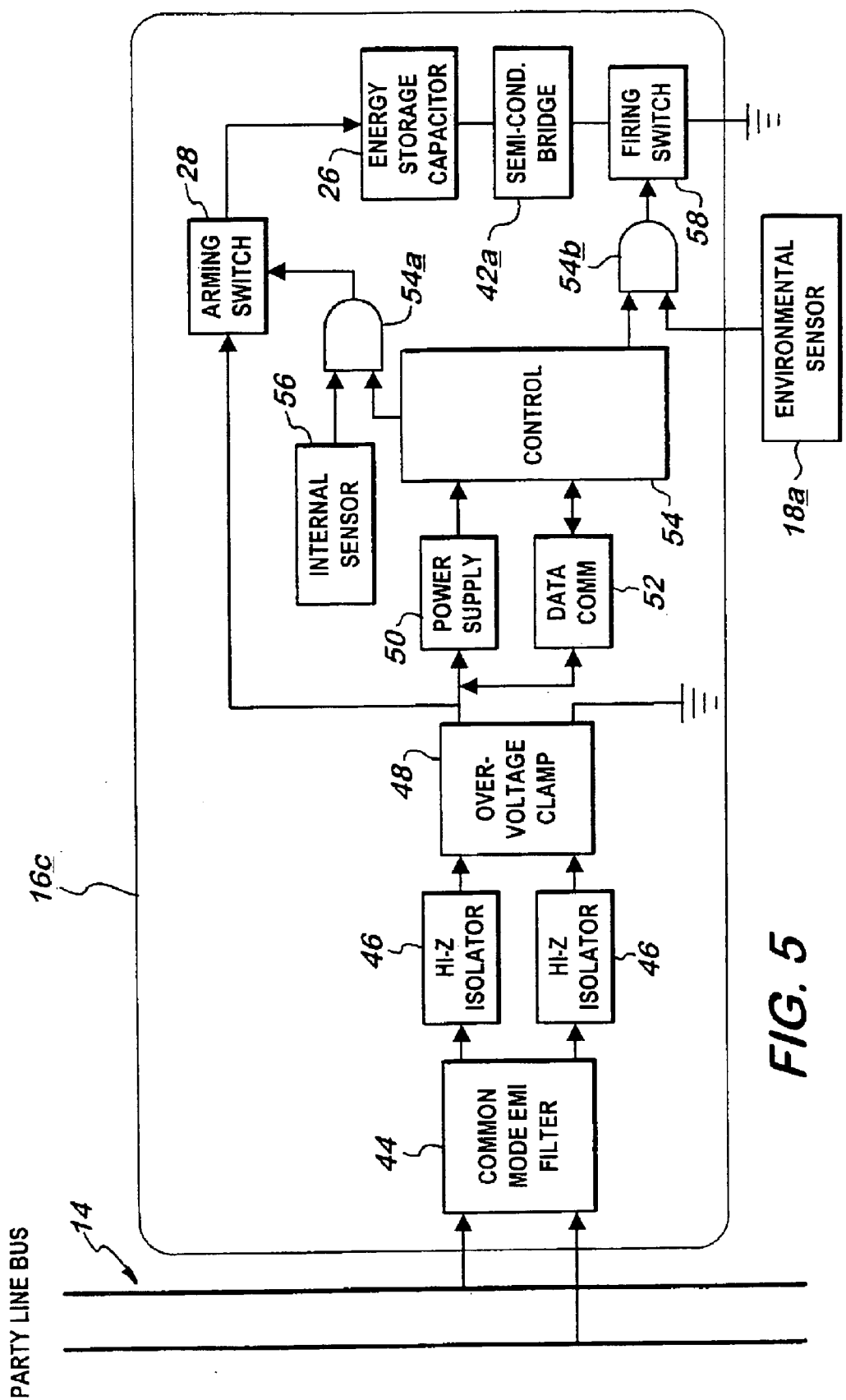
FIG. 5 is a schematic block diagram of an initiator in accordance with yet another embodiment of the invention.

There is shown in FIG. 5 an initiator 16c in accordance with a specific embodiment of the present invention. Initiator 16c is joined to a party line bus 14. Signals received from the firing control system via bus 14 pass through several buffer devices including common mode EMI (electromagnetic interference) filter 44, high impedance isolators 46 and over-voltage clamp 48. EMI filter 44 provides protection against susceptibility to random electro-magnetic signals that may be inadvertently conveyed along bus 14. Impedance isolators 46 limit the energy that can be received from bus 14 for use by the remainder of the initiator circuit.

A signal that meets the requirements of the buffer provided by EMI filter 44, isolators 46 and clamp 48 is then conveyed to arming switch 28, power supply circuit 50 and data communication circuit 52. An initiator control circuit 54 receives input from data communication circuit 52 and power supply 50 as well as status information from energy storage (e.g., capacitor) 26 and the initiation element, e.g., semiconductor bridge 42a. When the proper input signals are received from these sources, initiator control circuit 54 may issue an arming signal. In the illustrated embodiment, the arming signal is received by a logic gate 54a which also receives input from an internal sensor 56. If the output of internal sensor 56 is appropriate for the operation of arming switch 28, logic gate 54a may convey the control arming signal from control circuit 54 to arming switch 28, through which a charging voltage may be applied to the energy storage device, i.e., a firing capacitor 26. Optionally, charging may occur in a set fashion as described in connection with FIGS. 2 and 3. When the initiating element is a semiconductor bridge, the energy requirement for initiation is substantially smaller than in prior art devices, so firing capacitor 26, which may typically be sized to release only 5 millijoules, may be employed for a 1-ohm SCB, obviating the need for a battery as would be required by prior art devices. When appropriate signals are received, control circuit 54 may issue a control firing signal for firing switch 58. In the illustrated embodiment, an optional logic gate 54b compares the control firing signal to the output of an environmental sensor 18a and only conveys the control firing signal to the firing switch when the environmental sensor 18a indicates that conditions are appropriate for firing. The closure of firing switch 58 permits the discharge of firing capacitor 26 through the semiconductor bridge 42a or other initiation element, thus initiating the device.

In addition to providing input to logic gates 54a and 54b, internal sensor 56 and external sensor 18a may provide signals directly to initiator control circuit 54 and/or data communication circuit 52 so that initiator 16c can perform a self-test for readiness prior to the receipt of an arming or firing signal from party line bus 14. Optionally, the self test can be performed in response to a query signal received from bus 14 and the results may be reported in a response signal emitted along bus 14.

As indicated above, the present invention also finds utility in land vehicles, e.g., in automobiles, trucks, buses, trains, etc., for purposes that may include initiating the inflation of air bag safety systems. In such applications, the ordnance firing system includes sensors which signal to the firing control system circuitry the location of an impact on the vehicle, the occurrence of a roll-over, or other conditions that bear on which of the effectors, i.e., air bag inflators, should be initiated.

In the case of a land vehicle in which an ordnance firing system is used for initiating a safety system, e.g., air bag(s) and belt tensioners, a condition precedent to firing may be the sensing of an impact. Such safety systems are known and are disclosed in, e.g., U.S. Pat. No. 5,829,841 and U.S. Pat. No. 5,829,784, both of which are incorporated herein by reference as background information. The initial sensing of an impact may result in the issuance of a command to arm all the initiators in the system, but selected initiators might be programmed only to fire when associated sensors indicate an impact in the area of the initiator. Thus, the ordnance system can be programmed only to inflate a driver's side air bag when impact on the driver's side of vehicle is sensed. In contrast, the ordnance system may be programmed to initiate other effectors, e.g., seat belt tensioners, in response to a much broader range of sensor inputs, e.g., in response to the indication by any sensor of a vehicle impact. Thus, the ordnance firing system can be programmed so that some initiators are responsive to more sensor signals than others. In an alternative embodiment, certain sensor output signals may constitute conditions precedent to arming one or more of the initiators and either the firing control system or the initiator control circuitry may be responsive to the sensor so that the initiator is not armed until the sensor generates the appropriate signal.

The invention described herein provides initiators and an integrated ordnance system in which the initiators may have a high input impedance which, in turn, provides simple EMI control, protection against inadvertent initiation caused by transient signals and efficient energy storage. A variety of coupling arrangements may be used to establish a link between an initiator and a communication bus, including magnetic coupling. MEMS (micro-electronic machines) technology may optionally be incorporated for enhanced safety.

While the invention has been described in detail with respect to particular embodiments thereof, it will be apparent that upon a reading and understanding of the foregoing, numerous alterations to the described embodiments will occur to those skilled in the art and it is intended to include such alterations within the scope of the appended claims.

What is claimed is:

1. An aerospace device comprising:

a plurality of reactive effectors each initiator operatively associated therewith;

a firing control system circuitry in communication with the initiators; and at least one sensor, on the aerospace device, for sensing a condition precedent to arming or firing at least one initiator;

wherein at least one Initiator is in communication with to sensor and is responsive to the sensor and to the firing control system circuitry for initiating its associated reactive effector and is programmed to self-arm or initiate upon receipt of proper signals from both the firing control system circuitry and the sensor.

2. The aerospace device of claim 1 comprising a common bus through which the initiators are linked to the firing control system circuitry.

3. The aerospace device of claim 2 wherein the sensor is connected to the bus.

4. The aerospace device of claim 1 therein the sensor is connected to the initiator responsive to it.

5. The aerospace device of claim 1 wherein the initiator comprises a planar, low-energy initiation element.

6. An aerospace device comprising:

a plurality of reactive effectors each comprising an initiator comprising a planar, low-energy initiation element operatively associated therewith a firing control system circuitry in communication with the initiators; and at least one sensor, on the aerospace device, for sensing a condition precedent to arming or firing at least one initiator;

wherein at least one initiator is in communication with the sensor and is responsive to the sensor and to the firing control system circuitry for initiating its associated reactive effector upon receipt of proper signals from both the firing control system circuitry and the sensor, and further comprising means for taking a time-phased reading of the sensor and comparing the reading to a predetermined temporal profile and firing the initiator when to reading correlates to the predetermined profile.

7. The aerospace device of claim 6 comprising a common bus through which the initiators are linked to the firing control system circuitry.

8. The aerospace device of claim 7 wherein the at least one sensor is connected to the bus.

9. The aerospace device of claim 7 wherein the one sensor is connected to the initiator responsive to it.

10. An aerospace device comprising:

a plurality of reactive effectors each comprising an initiator operatively associated therewith;

a firing control system circuitry in communication with the initiators; and at least one sensor, on the aerospace device, for sensing a condition precedent to arming or firing at least one initiator;

wherein at least one initiator is in communication with the sensor and is responsive to the sensor and to the firing control system circuitry for initiating its associated reactive effector upon receipt of proper signals from both the firing control system circuitry and the sensor, and further comprising means for taking a time-phased reading of the sensor and comparing the reading to a predetermined temporal profile and firing the initiator when the reading correlates to the predetermined profile.

11. The aerospace device of claim 10 comprising a common bus through which the initiators are linked to the firing control system circuitry.

12. The aerospace device of claim 11 wherein the sensor is connected to the bus.

13. The aerospace device of claim 10 wherein the sensor is connected to the initiator responsive to it.

14. The aerospace device of claim 10 wherein the initiator comprises a planar, low-energy initiation element.

* * * * *